United States Patent
Minamisawa

(10) Patent No.: US 9,891,444 B2
(45) Date of Patent: Feb. 13, 2018

(54) OPTICAL UNIT WITH SHAKE CORRECTION FUNCTION

(71) Applicant: NIDEC SANKYO CORPORATION, Suwa-gun, Nagano (JP)

(72) Inventor: Shinji Minamisawa, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 98 days.

(21) Appl. No.: 14/763,602

(22) PCT Filed: May 13, 2014

(86) PCT No.: PCT/JP2014/062727
§ 371 (c)(1),
(2) Date: Jul. 27, 2015

(87) PCT Pub. No.: WO2014/192538
PCT Pub. Date: Dec. 4, 2014

(65) Prior Publication Data
US 2016/0170227 A1 Jun. 16, 2016

(30) Foreign Application Priority Data
May 30, 2013 (JP) ................................ 2013-114583

(51) Int. Cl.
G02B 27/64 (2006.01)
G03B 5/00 (2006.01)
(Continued)

(52) U.S. Cl.
CPC ............. *G02B 27/646* (2013.01); *G03B 5/00* (2013.01); *H04N 5/2254* (2013.01);
(Continued)

(58) Field of Classification Search
CPC .... G02B 27/64; G02B 27/642; G02B 27/644; G02B 27/646; G02B 7/023; G02B 7/04;
(Continued)

(56) References Cited

U.S. PATENT DOCUMENTS

| 2009/0052037 A1* | 2/2009 | Wernersson | G02B 27/646 359/554 |
| 2010/0091120 A1* | 4/2010 | Nagata | G02B 27/646 348/208.4 |
| 2014/0092476 A1* | 4/2014 | Ando | G02B 27/646 359/554 |

FOREIGN PATENT DOCUMENTS

| JP | 2008139811 A | 6/2008 |
| JP | 2009288769 A | 12/2009 |
| JP | 2011027949 A | 2/2011 |

OTHER PUBLICATIONS

International Search Report corresponding to Application No. PCT/JP2014/062727; dated Aug. 12, 2014, with English translation.

* cited by examiner

*Primary Examiner* — Bumsuk Won
*Assistant Examiner* — Ephrem Mebrahtu
(74) *Attorney, Agent, or Firm* — Cantor Colburn LLP

(57) ABSTRACT

An optical unit may include an optical module; a fixed body including a body part surrounding the optical module; a gimbal mechanism swingably supporting the optical module around a first axial line and a second axial line intersecting the optical axis direction and the first axial line; a shake correction drive mechanism including a coil and a magnet between a side face of the optical module and a side face of the body part; and a plate-shaped spring which is connected with the optical module and the fixed body to determine posture of the optical module when the shake correction drive mechanism is set in a stopped state. When viewed in
(Continued)

a direction perpendicular to the optical axis direction, the gimbal mechanism and the plate-shaped spring may be provided at positions overlapping with the shake correction drive mechanism.

23 Claims, 7 Drawing Sheets

(51) Int. Cl.
*H04N 5/225* (2006.01)
*H04N 5/232* (2006.01)

(52) U.S. Cl.
CPC ....... *H04N 5/2257* (2013.01); *H04N 5/23287* (2013.01); *G03B 2205/0007* (2013.01); *G03B 2205/0069* (2013.01)

(58) Field of Classification Search
CPC ... G02B 7/08; G02B 7/09; G02B 7/10; G03B 5/00; G03B 5/02; G03B 5/06; G03B 5/08; G03B 3/10; G03B 2205/0007; G03B 2205/0015; G03B 2205/0023; G03B 2205/0038; G03B 2205/0053; G03B 2205/0069; H04N 5/2254; H04N 5/2257; H04N 5/23248; H04N 5/23264; H04N 5/23287; G06T 5/003; G06T 2207/20201
See application file for complete search history.

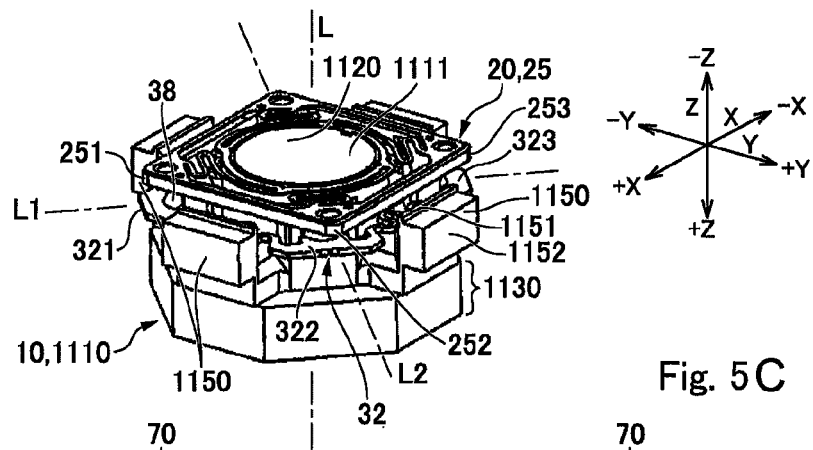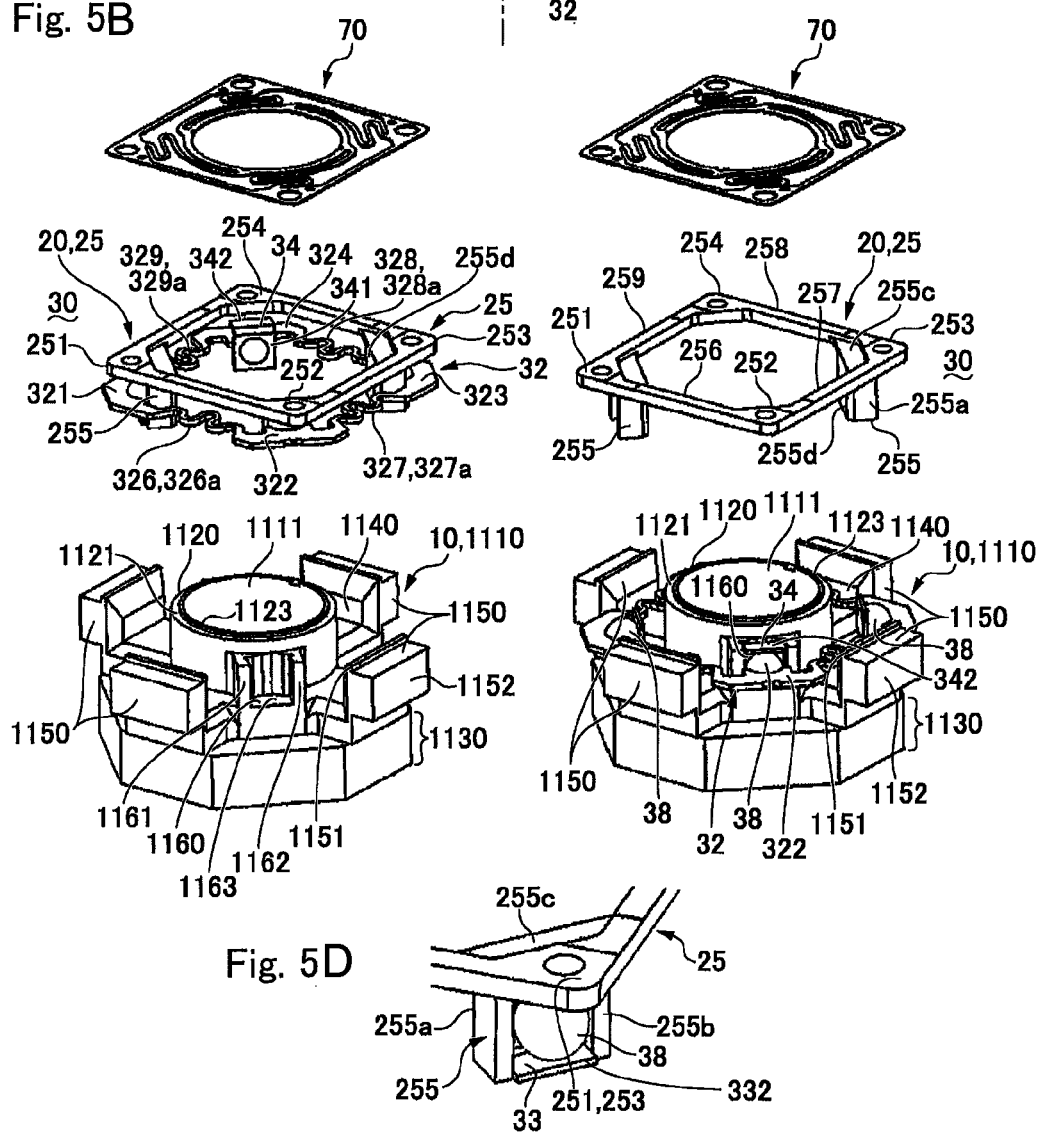
Fig. 5A
Fig. 5B
Fig. 5C
Fig. 5D

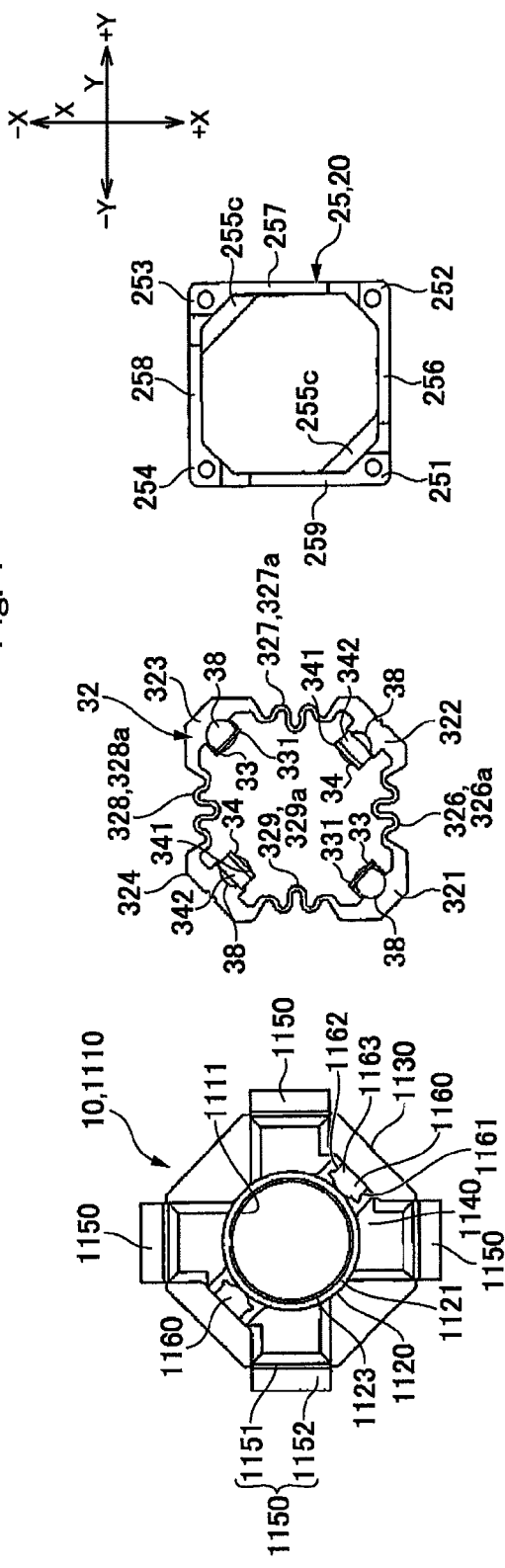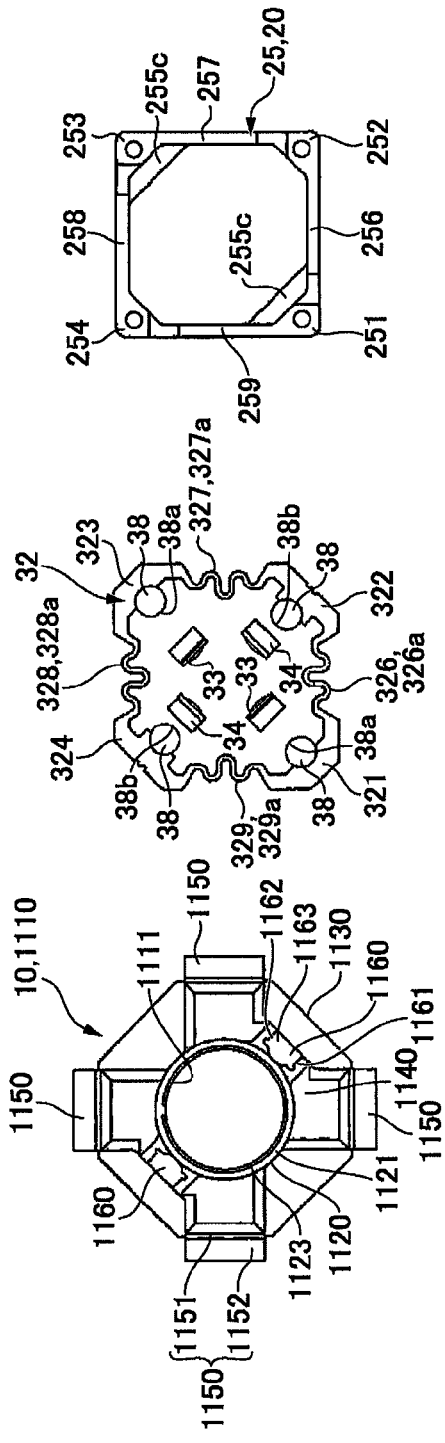

OPTICAL UNIT WITH SHAKE CORRECTION FUNCTION

CROSS-REFERENCE TO RELATED APPLICATIONS

This is the U.S. national stage of application No. PCT/JP2014/062727, filed on May 13, 2014, the disclosures of which are incorporated herein by reference. Priority under 35 U.S.C. § 119(a) and 35 U.S.C. § 365(b) is claimed from Japanese Application No. 2013-114583, filed May 30, 2013, the disclosure of which is also incorporated herein by reference.

TECHNICAL FIELD

The present invention relates to an optical unit with a shake correction function which is mounted on a cell phone with a camera or the like.

BACKGROUND

In recent years, a cell phone is structured as an optical device on which an optical unit for photographing is mounted. In the optical unit, in order to restrain disturbance of a photographed image due to a shake of a user's hand, a structure has been proposed in which an optical module is swung to correct the shake. In order to perform the shake correction, an optical module is required to be swingably supported with respect to a fixed body. Therefore, a structure that an optical module is supported by a pivot and the optical module and a fixed body are connected with each other through a plate-shaped spring has been proposed (see Patent Literature 1).

CITATION LIST

Patent Literature

[PTL 1] Japanese Patent Laid-Open No. 2009-288769

In a case that an optical module is structured to swing with a pivot as a swing center, a coil and a magnet structuring a shake correction drive mechanism are required to dispose at a position separated from the pivot. Therefore, when the optical module is swung with the pivot as a center, displacement of a portion of the optical module where the coil or the magnet is disposed is large. Accordingly, the coil and the magnet are required to be disposed at largely separated positions so that the coil and the magnet are not abutted with each other and thus the drive force becomes small.

SUMMARY

In view of the problem described above, at least an embodiment of the present invention provides an optical unit with a shake correction function which is capable of obtaining a large drive force when an optical module is to be swung.

In order to attain the above, at least an embodiment of the present invention provides an optical unit with a shake correcting function including an optical module, a fixed body having a body part which surrounds the optical module, a gimbal mechanism which swingably supports the optical module around a first axial line intersecting an optical axis direction and swingably supports the optical module around a second axial line intersecting the optical axis direction and the first axial line, a shake correction drive mechanism which comprises a coil and a magnet between a side face of the optical module and a side face of the body part and is structured to drive the optical module around the first axial line and around the second axial line, and a plate-shaped spring which is connected with the optical module and the fixed body to determine posture of the optical module when the shake correction drive mechanism is set in a stopped state. When viewed in a direction perpendicular to the optical axis direction, the gimbal mechanism and the plate-shaped spring are provided at positions overlapping with the shake correction drive mechanism.

In at least an embodiment of the present invention, a gimbal mechanism is used for swingably supporting the optical module and, when viewed in a direction perpendicular to the optical axis direction, the gimbal mechanism is provided at a position overlapping with the shake correction drive mechanism. Therefore, when the optical module is swung, displacement of a portion of the optical module where a coil or a magnet is disposed is small and thus, even when the coil and the magnet are brought close to each other, the coil and the magnet are hard to contact with each other. Accordingly, the coil and the magnet can be brought close to each other and thus a large drive force is obtained. Further, in a case of a gimbal mechanism, when driving is stopped, a force for returning the optical module to its original posture is small, or a force for returning the optical module to its original posture is not generated. However, in at least an embodiment of the present invention, a plate-shaped spring is connected with the optical module and the fixed body and thus, when driving is stopped, the optical module can be surely returned to its original posture. Further, when viewed in a direction perpendicular to the optical axis direction, the plate-shaped spring is provided at a position overlapping with the shake correction drive mechanism. Therefore, when the optical module is swung, displacement of a portion of the optical module where the plate-shaped spring is disposed is small and thus deformation of the plate-shaped spring is small. Accordingly, a resistance force by the plate-shaped spring is small and thus, when the optical module is to be swung, a large swing force can be applied to the optical module. Further, since deformation of the plate-shaped spring is small, a structure of the plate-shaped spring can be simplified.

In at least an embodiment of the present invention, it is preferable that, when viewed in the direction perpendicular to the optical axis direction, the gimbal mechanism is provided at a position nearer to a center position of the shake correction drive mechanism in the optical axis direction than the plate-shaped spring. According to this structure, when the optical module is swung, displacement of a portion of the optical module where the coil or the magnet is disposed can be made small. Therefore, the coil and the magnet can be brought close to each other and thus a large drive force is obtained.

In at least an embodiment of the present invention, it is preferable that the gimbal mechanism includes a movable frame in a rectangular shape provided around an optical axis with a first corner part, a second corner part adjacent to the first corner part, a third corner part separated from the first corner part in a first axial line direction, and a fourth corner part separated from the second corner part in a second axial line direction, and the first corner part and the third corner part of the movable frame are swingably supported by the fixed body, and the second corner part and the fourth corner part of the movable frame swingably support the optical module. According to this structure, even when the optical module is swingably supported by the fixed body through the gimbal mechanism, a space for disposing the shake correction drive mechanisms can be secured between a side face of the optical module and a side face of the fixed body.

In at least an embodiment of the present invention, it is preferable that the fixed body includes a fixed body side rectangular frame with which the plate-shaped spring is connected, and the first corner part and the third corner part of the movable frame are swingably supported by the fixed body side rectangular frame. According to this structure, the gimbal mechanism is structured by utilizing the fixed body side rectangular frame with which the plate-shaped spring is connected and thus, assembling is easily performed and the number of components can be reduced.

In at least an embodiment of the present invention, it is preferable that the coil is held by the optical module and the magnet is held by an inner face of the body part. According to this structure, the coil whose weight is lighter than the magnet is provided in the optical module and thus a drive current for shake correction can be made small and responsibility of the shake correction can be improved.

In at least an embodiment of the present invention, it is preferable that the optical module includes an optical component and a holder which holds the optical component, and the holder is provided with an optical component holding part which holds the optical component, a movable frame arrangement space in which the movable frame is disposed on an outer side in a radial direction with respect to the optical component holding part, and a coil holding part which holds the coil used in the shake correction drive mechanism on an outer side with respect to the movable frame arrangement space. According to this structure, when viewed in the optical axis direction, the gimbal mechanism can be provided on an inner side with respect to an outward form of the holder.

In at least an embodiment of the present invention, it is preferable that the coil is an air-core coil and the coil holding part is provided with a protruded part which is fitted to an opening part of the coil. According to this structure, the coil can be easily and surely provided at a predetermined position.

In at least an embodiment of the present invention, it is preferable that the protruded part is protruded from a face of the coil facing the magnet toward the magnet. According to this structure, even in a case that the optical module is swung due to an impact or the like or, even in a case that the optical module is displaced in a direction perpendicular to the optical axis direction, the coil is not abutted with the magnet. Therefore, damage of the coil can be prevented.

In at least an embodiment of the present invention, it is preferable that the coil holding part is provided on an outer side in a radial direction with respect to a middle position between the first corner part and the second corner part, on an outer side in the radial direction with respect to a middle position between the second corner part and the third corner part, on an outer side in the radial direction with respect to a middle position between the third corner part and the fourth corner part, and on an outer side in the radial direction with respect to a middle position between the fourth corner part and the first corner part. According to this structure, the coil holding parts are provided at angular positions displaced from the corner parts of the movable frame and thus, when viewed in the optical axis direction, an outward form of the holder can be made small.

In at least an embodiment of the present invention, it is preferable that the fixed body includes a yoke provided with the body part and an end plate part in a frame shape which is protruded from a front side end part of the body part in the optical axis direction to an inner side in the radial direction, and the end plate part is formed with an opening part whose opening edge is located on an outer side in the radial direction relative to a face of the magnet facing the coil when viewed in the optical axis direction. According to this structure, magnetic lines of force of the magnet can be suppressed from going to the end plate part of the yoke on the front side in the optical axis direction. Therefore, intensity of the magnetic field interlinking with the coil can be increased.

In at least an embodiment of the present invention, it is preferable that a nonmagnetic cover is fixed to the end plate part of the yoke, and the cover is provided with a front plate part, which is formed in a frame shape and is overlapped with a face of the end plate part on a front side in the optical axis direction, and a tube part which is protruded from an inner circumferential edge of the front plate part toward a rear side in the optical axis direction through the opening part and surrounds a front side end part in the optical axis direction of the optical module. According to this structure, dust and the like can be suppressed from entering into the inside. Further, the cover is made of nonmagnetic material and thus, even when the cover is provided, magnetic lines of force of the magnet can be suppressed from going in an unnecessary direction. Therefore, intensity of magnetic field interlinked with the coil can be increased.

In at least an embodiment of the present invention, it is preferable that a plate-shaped stopper is fixed to the front plate part so as to surround the front side end part of the optical module when viewed from the front side in the optical axis direction. According to this structure, even in a case that the optical module is swung due to an impact or the like, or even in a case that the optical module is displaced in a direction perpendicular to the optical axis direction, its displaced amount can be restricted by the plate-shaped stopper.

In at least an embodiment of the present invention, it is preferable that a flexible circuit board is connected with a rear side end part of the optical module in the optical axis direction so as to extend along a first direction perpendicular to the optical axis direction. The flexible circuit board is provided with a first curved part which is bent in a circular arc shape at a position on one side in the first direction with respect to a portion overlapping with the optical module in the optical axis direction toward the other side in the first direction, a strip-shaped part which is extended to the other side in the first direction from the first curved part, and a second curved part which is bent in a circular arc shape at an end part located on the other side in the first direction with respect to a portion of the strip-shaped part overlapping with the optical module in the optical axis direction toward the one side in the first direction. The first curved part, the strip-shaped part and the second curved part are branched into two portions through a slit extending along the first direction in the second direction perpendicular to the optical axis direction and the first direction.

In at least an embodiment of the present invention, it is preferable that, in the gimbal mechanism, a swing support part provided between the first corner part and the fixed body and a swing support part provided between the third corner part and the fixed body respectively include a protruded part which is provided in one of the movable frame and the fixed body and a receiving part in a concave shape which is provided in the other of the movable frame and the fixed body and receives a tip end side of the protruded part, and a swing support part provided between the second corner part and the optical module and a swing support part provided between the fourth corner part and the optical module respectively include a protruded part which is provided in one of the movable frame and the optical module and a receiving part in a concave shape which is provided in the other of the movable frame and the optical module and receives a tip end side of the protruded part. According to this structure, assembling process can be simplified in comparison with a case swingably structured through a shaft body.

In at least an embodiment of the present invention, it is preferable that a tip end face of the protruded part located on a receiving part side is formed in a hemispheric shape. According to this structure, even when the movable frame and the optical module are swung in any posture, sliding of the protruded part on the receiving part is smooth.

In this case, the protruded part is, for example, structured of a spherical body.

In at least an embodiment of the present invention, it is preferable that, in the movable frame, a first connecting part which connects the first corner part with the second corner part, a second connecting part which connects the second corner part with the third corner part, a third connecting part which connects the third corner part with the fourth corner part, and a fourth connecting part which connects the fourth corner part with the first corner part are respectively capable of being elastically deformed and, in all of the first corner part, the second corner part, the third corner part and the fourth corner part, the protruded part and the receiving part are elastically contacted with each other by elasticity of the first connecting part, the second connecting part, the third connecting part and the fourth connecting part. According to this structure, rattling is hard to be occurred between the protruded part and the receiving part.

In this case, it may be structured that each of the first connecting part, the second connecting part, the third connecting part and the fourth connecting part is provided with a meandering part which meanders in a direction intersecting the optical axis direction.

In at least an embodiment of the present invention, it may be structured that each of the protruded parts is provided on a movable frame side. According to this structure, a structure of the gimbal mechanism can be simplified.

In at least an embodiment of the present invention, it is preferable that the protruded parts are respectively located in the same plane intersecting the optical axis as each other. According to this structure, a structure of the gimbal mechanism can be simplified.

In at least an embodiment of the present invention, it is preferable that each of the protruded parts is provided on an inner side of the movable frame, two receiving parts provided in the first corner part and the third corner part are formed in a portion which is protruded in the optical axis direction from a fixed body side and is located on an inner side of the movable frame, and two receiving parts provided in the second corner part and the fourth corner part are formed in a portion which is protruded in the optical axis direction from an optical module side and is located on an inner side of the movable frame. According to this structure, even when a plurality of the protruded parts are located in the same plane intersecting the optical axis, the protruded part and the receiving part can be abutted with each other appropriately.

In at least an embodiment of the present invention, it is preferable that the two receiving parts provided in the first corner part and the third corner part are formed in a portion which is protruded from one side position in the optical axis direction with respect to the movable frame to the other side in the optical axis direction and is located on the inner side of the movable frame, and the two receiving parts provided in the second corner part and the fourth corner part are formed in a portion which is protruded from the other side position in the optical axis direction with respect to the movable frame to the one side in the optical axis direction and is located on the inner side of the movable frame.

In at least an embodiment of the present invention, it is preferable that the two receiving parts provided in the first corner part and the third corner part are respectively formed in a plate-shaped member which is fixed to the fixed body side, and the two receiving parts provided in the second corner part and the fourth corner part are respectively formed in a plate-shaped member which is fixed to the optical module side. According to this structure, regardless of structure and material of the fixed body and the optical module, the receiving part can be structured superior in slidability and durability for the protruded part.

In at least an embodiment of the present invention, it is preferable that the fixed body includes two wall faces, which surround each of the two protruded parts provided in the first corner part and the third corner part from both sides, and two wall faces which surround each of the two protruded parts provided in the first corner part and the third corner part from both sides in the optical axis direction, and the optical module includes two wall faces, which surround each of the two protruded parts provided in the second corner part and the fourth corner part from both sides, and two wall faces which surround each of the two protruded parts provided in the second corner part and the fourth corner part from both sides in the optical axis direction. According to this structure, even when an impact is applied, the protruded part is hard to be disengaged from the receiving part.

In at least an embodiment of the present invention, a gimbal mechanism is used for swingably supporting the optical module and, when viewed in a direction perpendicular to the optical axis direction, the gimbal mechanism is provided at a position overlapping with the shake correction drive mechanism. Therefore, when the optical module is swung, displacement of a portion of the optical module where a coil or a magnet is disposed is small and thus, even when the coil and the magnet are brought close to each other, the coil and the magnet are hard to contact with each other. Accordingly, the coil and the magnet can be brought close to each other and thus a large drive force is obtained. Further, in a case of a gimbal mechanism, when driving is stopped, a force for returning the optical module to its original posture is small or no force for returning the optical module to its original posture is generated. However, in at least an embodiment of the present invention, a plate-shaped spring is connected with the optical module and the fixed body and thus, when driving is stopped, the optical module can be surely returned to its original posture. Further, when viewed in a direction perpendicular to the optical axis direction, the plate-shaped spring is provided at a position overlapping with the shake correction drive mechanism. Therefore, when the optical module is swung, displacement of a portion of the optical module where the plate-shaped spring is disposed is small and thus deformation of the plate-shaped spring is small. Accordingly, a resistance force by the plate-shaped spring is small and thus, when the optical module is to be swung, a large swing force can be applied to the optical module. Further, since deformation of the plate-shaped spring is small, a structure of the plate-shaped spring can be simplified.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 5A through 5D are perspective views showing a gimbal mechanism and the like of an optical unit with a shake correction function to which at least an embodiment of the present invention is applied.

FIGS. 7A and 7B are explanatory plan views showing a structure of members used in a gimbal mechanism of an optical unit with a shake correction function to which at least an embodiment of the present invention is applied.

DESCRIPTION OF EMBODIMENTS

An embodiment of the present invention will be described below with reference to the accompanying drawings. In the following description, a structure for preventing a hand shake in a photographing unit will be described as an example. Further, in the following description, three directions perpendicular to each other are set to be an "X"-axis, a "Y"-axis and a "Z"-axis and a direction along an optical axis "L" (lens optical axis/optical axis of an optical element) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side/rear side in an optical axis direction) of the "Z"-axis, and "−Z" is indicated on the other side (object side/front side in the optical axis direction).
(Entire Structure of Optical Unit for Photographing)

Figure 1:
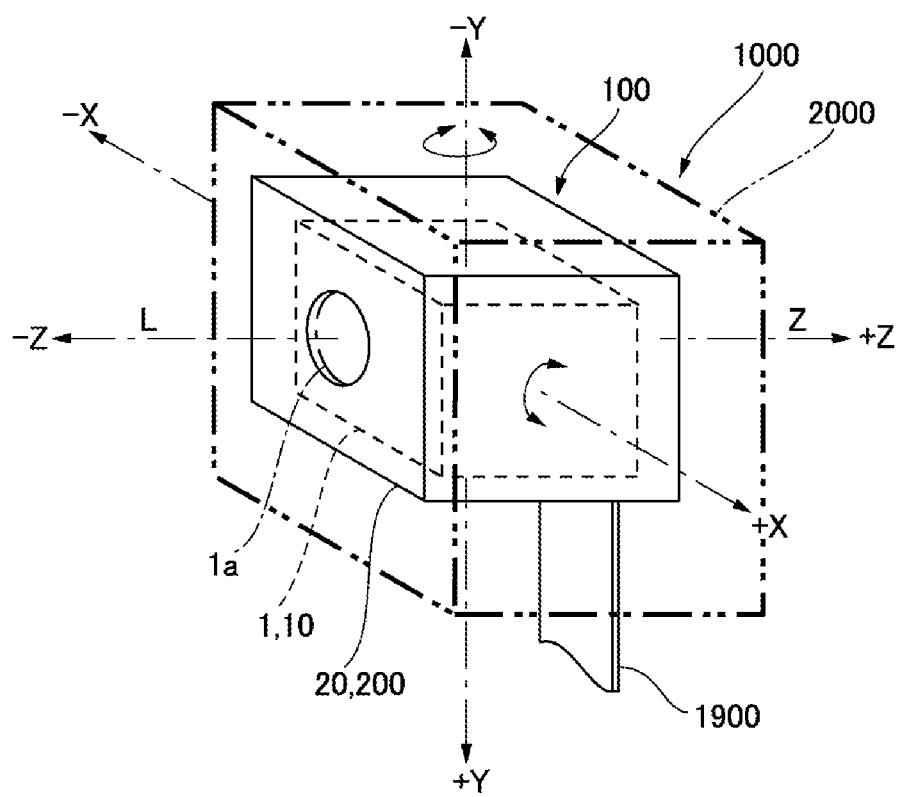
FIG. 1 is an explanatory view schematically showing a state in which an optical unit with a shake correction function to which at least an embodiment of the present invention is applied is mounted on an optical device such as a cell phone.

FIG. 1 is an explanatory view schematically showing a state in which an optical unit with a shake correction function to which at least an embodiment of the present invention is applied is mounted on an optical device such as a cell phone.

An optical unit 100 (optical unit with a shake correction function) shown in FIG. 1 is a thin camera used in an optical device 1000 such as a cell phone with a camera and is mounted in a state supported by a chassis 2000 (device main body) of the optical device 1000. In the optical unit 100, when a shake such as a hand shake is occurred in the optical device 1000 at the time of photographing, disturbance occurs in a photographed image. Therefore, the optical unit 100 in this embodiment includes, as described below, a shake correction drive mechanism (not shown in FIG. 1) which swingably supports an optical module 10 having a photographing unit 1 within a fixed body 20 and swings the photographing unit 1 on the basis of a detection result for a hand shake by a shake detection sensor such as a gyroscope mounted on the optical unit 100 or a gyroscope mounted on a main body side of the optical device 1000.

Further, a flexible circuit board 1900 is led out from the optical unit 100 for supplying power to the photographing unit 1 and the shake correction drive mechanism and the flexible circuit board 1900 is electrically connected with a host control section or the like which is provided on a main body side of the optical device 1000. Further, the flexible circuit board 1900 is also provided with a function for outputting a signal from the photographing unit 1. In this embodiment, when viewed in a direction of an optical axis "L", a lens 1a is circular but the optical module 10 is in a rectangular shape.
(Schematic Structure of Optical Unit 100)

Figure 2A:
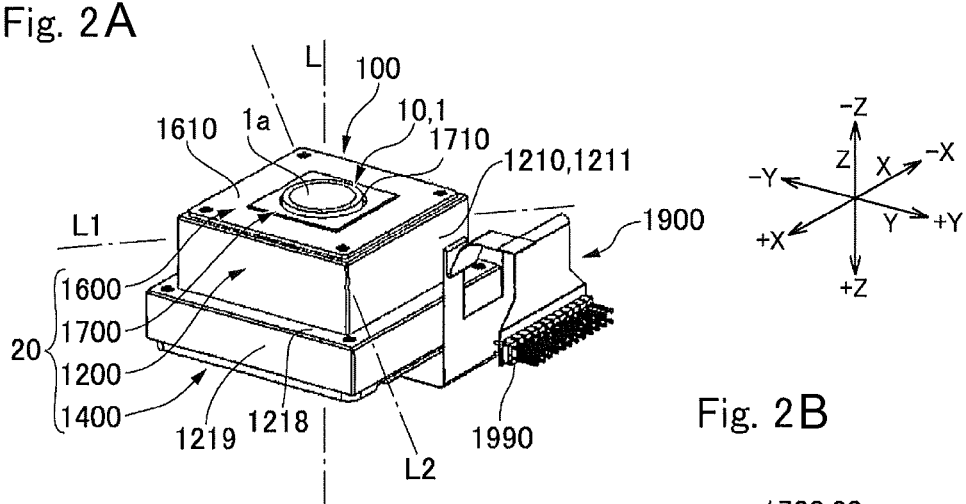
FIGS. 2A and 2B are perspective views showing an outward appearance of an optical unit with a shake correction function and the like to which at least an embodiment of the present invention is applied.
Figure 2B:
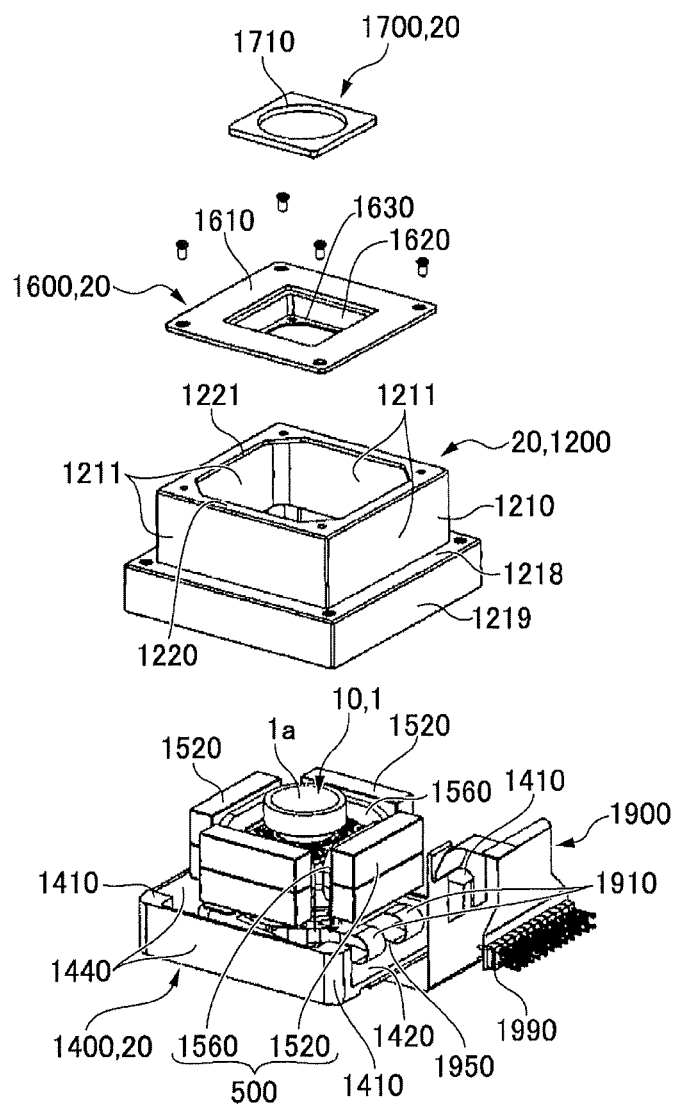
Figure 3A:
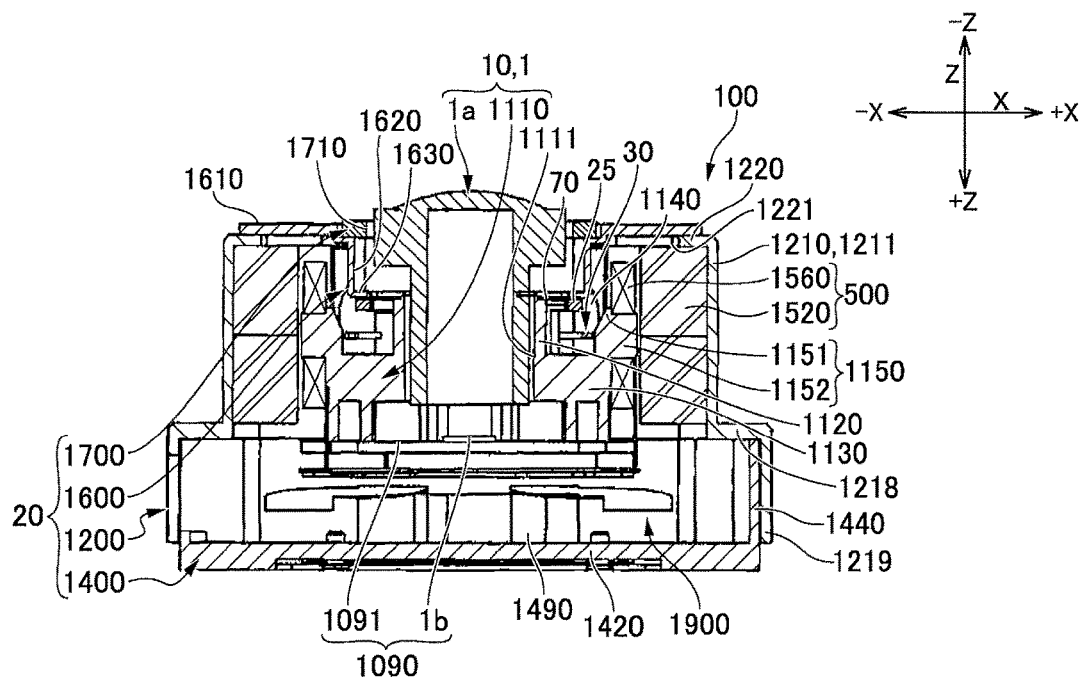
FIGS. 3A and 3B are explanatory views showing a cross sectional structure of an optical unit with a shake correction function to which at least an embodiment of the present invention is applied.
Figure 3B:
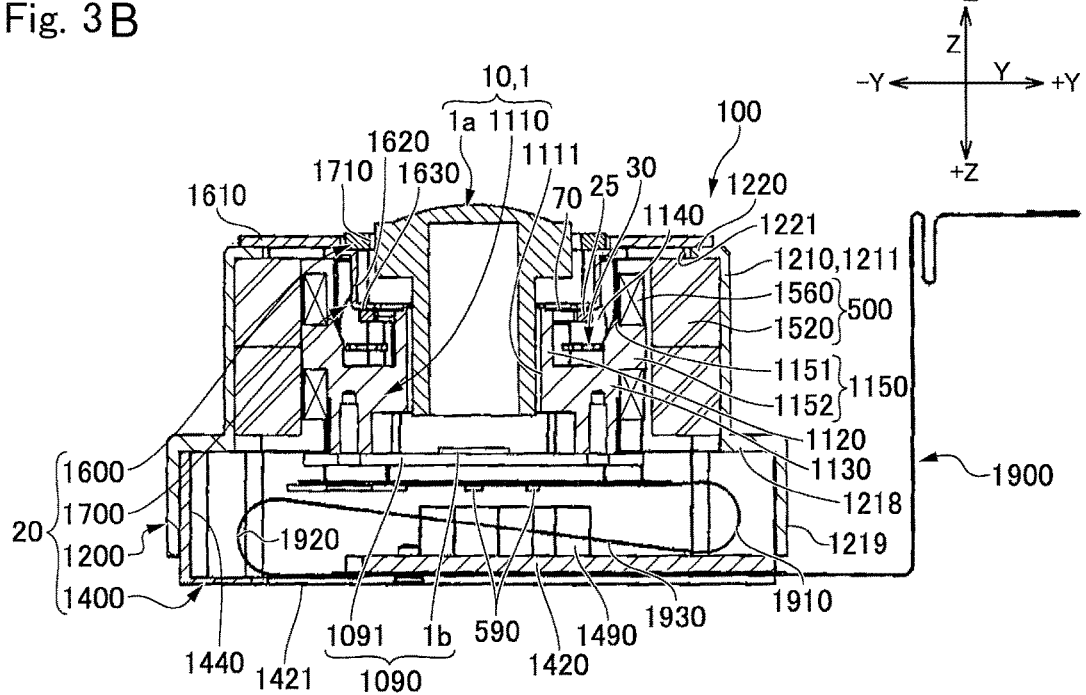
Figure 4:
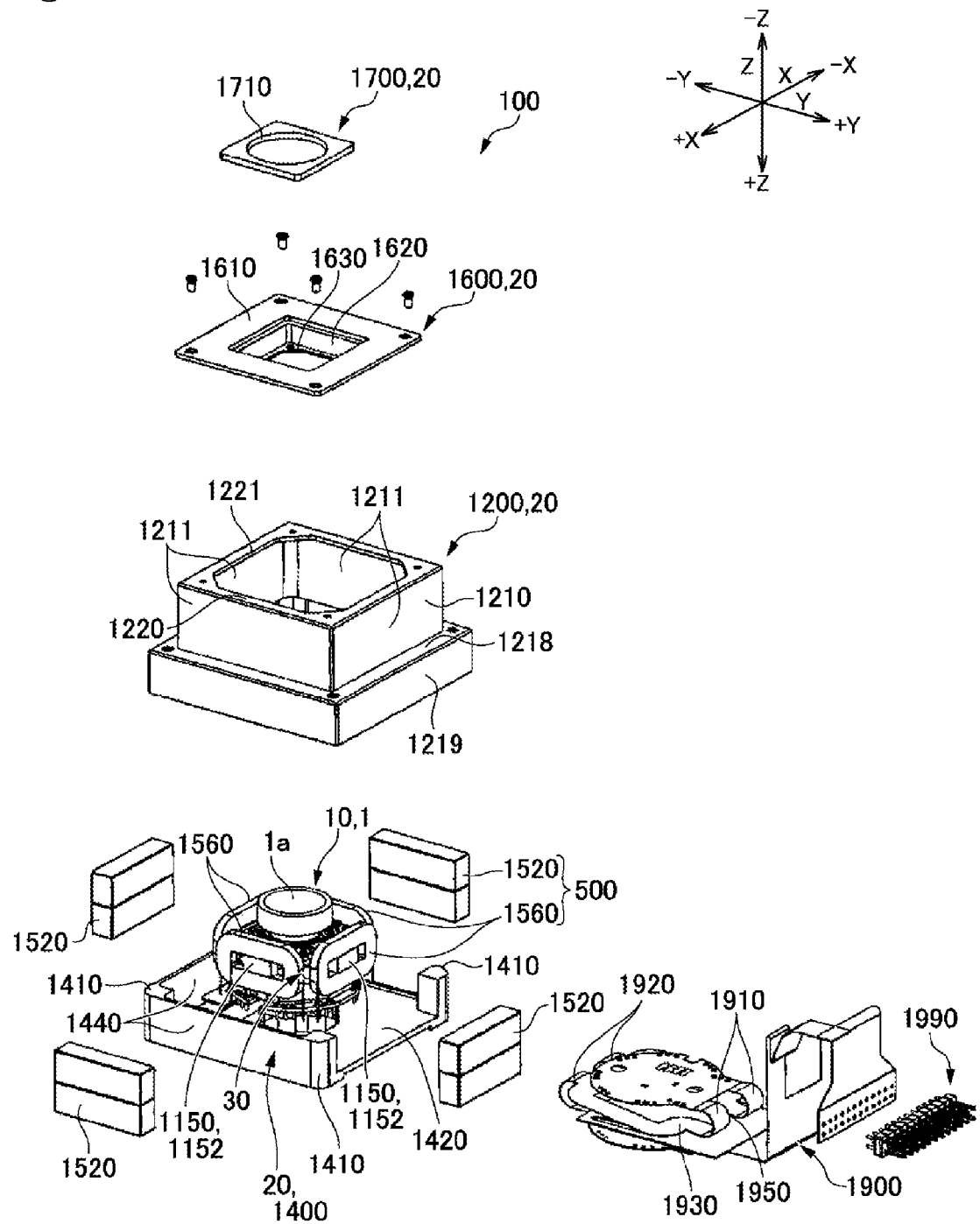
FIG. 4 is an exploded perspective view showing an optical unit with a shake correction function to which at least an embodiment of the present invention is applied which is further disassembled.

FIGS. 2A and 2B are perspective views showing an outward appearance of the optical unit 100 with a shake correction function and the like to which at least an embodiment of the present invention is applied. FIG. 2A is a perspective view showing the optical unit when viewed from an object side and FIG. 2B is an exploded perspective view showing the optical unit. FIGS. 3A and 3B are explanatory views showing a cross sectional structure of the optical unit 100 with a shake correction function to which at least an embodiment of the present invention is applied. FIG. 3A is an "X-Z" cross-sectional view showing the optical unit and FIG. 3B is a "Y-Z" cross-sectional view showing the optical unit. FIG. 4 is an exploded perspective view showing the optical unit 100 with a shake correction function to which at least an embodiment of the present invention is applied which is further disassembled.

In FIGS. 2A and 2B FIGS. 3A and 3B and FIG. 4, the optical unit 100 in this embodiment includes a fixed body 20, an optical module 10, a gimbal mechanism 30 which supports the optical module 10 so as to be capable of displacing with respect to the fixed body 20, and a shake correction drive mechanism 500 structured to generate a magnetic drive force for relatively displacing the optical module 10 with respect to the fixed body 20 between the optical module 10 and the fixed body 20.

The fixed body 20 is provided with an upper case 1200. The upper case 1200 is provided with a rectangular tube-shaped body part 1210 (body part) surrounding the optical module 10 and a rectangular frame-shaped end plate part 1220 which is protruded to an inner side in a radial direction from an end part of the rectangular tube-shaped body part 1210 on the other side "−Z" in the "Z"-axis direction. An opening part 1221 is formed in the end plate part 1220. In the upper case 1200, the rectangular tube-shaped body part 1210 is provided with a rectangular frame-shaped flange part 1218, which is enlarged to an outer side in the radial direction on an opposite side ("+Z" side) to an object side (side where the optical axis "L" is extended), and a rectangular tube part 1219 which is extended to one side "+Z" in the "Z"-axis direction from an outer side edge of the rectangular frame-shaped flange part 1218.

(Structure of Shake Correction Drive Mechanism 500)

The shake correction drive mechanism 500 is a magnetic drive mechanism which utilizes plate-shaped magnets 1520 and coils 1560. The coils 1560 are held by the optical module 10 and the magnets 1520 are held by inner faces of four side plate parts 1211 of the rectangular tube-shaped body part 1210 of the upper case 1200. In this embodiment, the magnet 1520 is magnetized so that its outer face side pole and its inner face side pole are different from each other. Further, the magnet 1520 is divided into two pieces in the optical axis direction and is magnetized so that magnetic poles located on the coil 1560 side are different from each other. Therefore, long side portions of the coil 1560 disposed on the upper and lower sides are utilized as an effective side. Magnetizing patterns on outer face sides and inner face sides of four magnets 1520 are the same as each other. Therefore, adjacent magnets 1520 in the circumferential direction are not attracted to each other and thus assembling and the like are easily performed.

In this embodiment, the upper case 1200 is structured of magnetic material and functions as a yoke for the magnets 1520. Further, the end plate part 1220 of the upper case 1200 is formed with an opening part 1221 whose opening edge is located on an outer side in the radial direction relative to faces of the magnets 1520 facing the coils 1560 when viewed in the optical axis "L" direction. Therefore, magnetic lines of force of the magnet 1520 can be suppressed from going to a side of the end plate part 1220 of the upper case 1200 (yoke) on a front side in the optical axis "L" direction.

(Structure of Optical Module 10)

The optical module 10 includes the photographing unit 1, a holder 1110 which holds a lens 1a (optical component) of the photographing unit 1, and a circuit module 1090 which is fixed to an end part of the holder 1110 on one side "+Z" in the "Z"-axis direction.

The holder 1110 structures an outer peripheral portion of the optical module 10 and is generally provided with an optical component holding part 1120 in a tube shape holding the lens 1a and a flange part 1130 having a large wall thickness which is enlarged from an end part of the optical component holding part 1120 on one side "+Z" in the "Z"-axis direction. The holder 1110 is formed with a through hole 1111 penetrating through the optical component holding part 1120 and the flange part 1130. The through hole 1111 is formed so that a diameter of a portion located on an inner side of the flange part 1130 is large than that of a portion located on an inner side of the optical component holding part 1120.

Further, on an outer side in the radial direction of the optical component holding part 1120, the holder 1110 is provided with a movable frame arrangement space 1140 where a movable frame 32 of the gimbal mechanism 30 is disposed and coil holding parts 1150 which hold the coils 1560 on an outer side with respect to the movable frame arrangement space 1140. The coil holding part 1150 is a portion which is stood up from an outer side edge of the flange part 1130 toward the other side "−Z" in the "Z"-axis direction on an outer side in the radial direction with respect to the movable frame arrangement space 1140 and is formed at four positions in the circumferential direction. The coil holding part 1150 is comprised of a plate-shaped part 1151 which is stood up from an outer side edge of the flange part 1130 toward the other side "−Z" in the "Z"-axis direction and a protruded part 1152 which is protruded from the plate-shaped part 1151 to an outer side in the radial direction. In this embodiment, the coil 1560 is an air-core coil and is adhesively bonded to the coil holding part 1150 in a state that the protruded part 1152 is fitted to an opening part of the air-core coil. In this state, a part of the protruded part 1152 is protruded from an outer face of the coil 1560 (face which faces the magnet 1520).

In the optical module 10 structured as described above, a flexible circuit board 1900 is connected with an end part of the optical module 10 on one side "+Z" in the "Z"-axis direction (end part of the circuit module 1090 on one side "+Z" in the "Z"-axis direction). The flexible circuit board 1900 is extended along the "Y"-axis direction and led out to the outside of the optical unit 100. A connector 1990 is connected with an end part of the flexible circuit board 1900 in the outside of the optical unit 100 and power is supplied to the coils 1560 through the connector 1990 and the flexible circuit board 1900. Further, a photographed result in an imaging element 1b is outputted through the flexible circuit board 1900 and the connector 1990.

(Detailed Structure of Fixed Body 20)

The fixed body 20 includes a rectangular lower case 1400 which covers one side "+Z" in the "Z"-axis direction of the upper case 1200. The lower case 1400 is provided with a rectangular bottom plate part 1420 and pillar shaped parts 1410 which are protruded from four corners of the bottom plate part 1420 toward the other side "−Z" in the "Z"-axis direction. When the upper case 1200 is covered so as to cover the lower case 1400, the flange part 1218 of the upper case 1200 is abutted with the pillar shaped parts 1410. Therefore, the upper case 1200 and the lower case 1400 are fixed to each other by fastening the flange part 1218 to the pillar shaped parts 1410 by using screws. In this embodiment, the lower case 1400 is provided with side plate parts 1440 on one side "+X" in the "X"-axis direction and on the other side "−Y" in the "Y"-axis direction.

Further, the fixed body 20 includes a cover 1600 and a plate-shaped stopper 1700 on the other side "−Z" in the "Z"-axis direction. The cover 1600 is a nonmagnetic metal plate and is provided with a front plate part 1610 in a rectangular frame shape which is overlapped with a face of the end plate part 1220 of the upper case 1200 on the other side "−Z" in the "Z"-axis direction, a tube part 1620 in a rectangular tube shape which is protruded from an inner circumferential edge of the front plate part 1610 toward one side "+Z" in the "Z"-axis direction (rear side in the optical axis direction) through the opening part 1221 of the upper case 1200 so as to surround an end part of the optical module 10 on one side "+Z" in the "Z"-axis direction, and a rear plate part 1630 in a rectangular frame shape which is protruded from an end part on one side "+Z" in the "Z"-axis direction of the tube part 1620 to an inner side in the radial direction.

The fixed body 20 includes a plate-shaped stopper 1700 which is fixed to the front plate part 1610 of the cover 1600. The plate-shaped stopper 1700 surrounds an end part of the optical module 10 on the other side "−Z" in the "Z"-axis direction. More specifically, a center of the plate-shaped stopper 1700 is formed with a window 1710 through which an end part of the optical module 10 on the other side "−Z" in the "Z"-axis direction is penetrated. A dimension of an inner diameter of the window 1710 is larger than a dimension of an outer diameter of the end part of the optical module 10 on the other side "−Z" in the "Z"-axis direction. Therefore, a movable range in the "X"-axis direction and a movable range in "Y"-axis direction of the optical module 10 are restricted by the plate-shaped stopper 1700.

(Structure of Flexible Circuit Board 1900)

In the optical unit 100 in this embodiment, the bottom plate part 1420 of the lower case 1400 is formed with an opening part 1421 and the flexible circuit board 1900 which is connected with the end part of the optical module 10 on one side "+Z" in the "Z"-axis direction is extended to the outside of the optical unit 100 through the opening part 1421.

In this embodiment, the flexible circuit board 1900 is connected with the end part of the optical module 10 on one side "+Z" in the "Z"-axis direction and, first, is extended to one side "+Y" in the "Y"-axis direction (first direction) and, after that, is extended to the outside through the opening part 1421 of the bottom plate part 1420 of the lower case 1400 and then, is further extended to one side "+Y" in the "Y"-axis direction. In this case, the flexible circuit board 1900 is provided with a first curved part 1910 which is bent in a circular arc shape at a position on one side "+Y" in the "Y"-axis direction with respect to a portion superposed on the optical module 10 on one side "+Z" in the "Z"-axis direction toward the other side "−Y" in the "Y"-axis direction, a strip-shaped part 1930 which is extended from the first curved part 1910 to the other side "−Y" in the "Y"-axis direction, and a second curved part 1920 which is bent in a circular arc shape at an end part of the strip-shaped part 1930 located on the other side "−Y" in the "Y"-axis direction with respect to the portion superposed on the optical module 10 on one side "+Z" in the "Z"-axis direction toward one side "+Y" in the "Y"-axis direction. In this embodiment, the first curved part 1910 and the second curved part 1920 are curved with the same radius of curvature as each other.

The first curved part 1910, the strip-shaped part 1930 and the second curved part 1920 of the flexible circuit board 1900 are branched and divided into two portions in the "X"-axis direction (second direction) through a slit 1950 extending along the "Y"-axis direction.

(Structure of Gimbal Mechanism 30)

Figure 6:
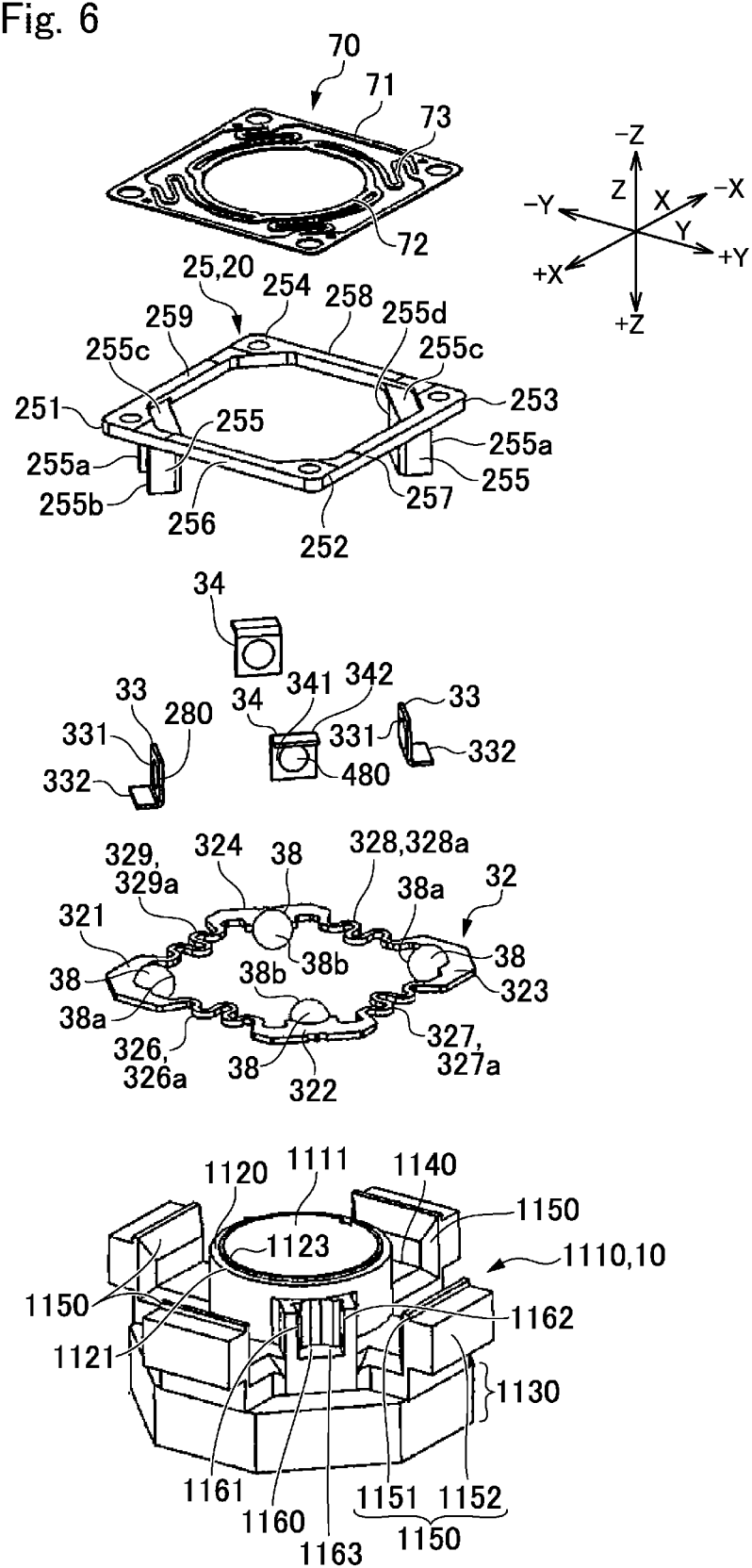
FIG. 6 is an exploded perspective view showing a gimbal mechanism and the like of an optical unit with a shake correction function to which at least an embodiment of the present invention is applied.

FIGS. 5A through 5D are perspective views showing a gimbal mechanism and the like of the optical unit 100 with a shake correction function to which at least an embodiment of the present invention is applied. FIG. 5A is a perspective view showing a state that a gimbal mechanism is attached to the holder, FIG. 5B is a perspective view showing a state that a movable frame and a fixed body side rectangular frame are detached from the holder, FIG. 5C is a perspective view showing a state that the fixed body side rectangular frame is detached from the holder, and FIG. 5D is a perspective view showing a first corner part of the fixed body side rectangular frame. FIG. 6 is an exploded perspective view showing the gimbal mechanism and the like of the optical unit 100 with a shake correction function to which at least an embodiment of the present invention is applied. FIGS. 7A and 7B are explanatory plan views showing a structure of members which are used in the gimbal mechanism of the optical unit 100 with a shake correction function to which at least an embodiment of the present invention is applied. FIG. 7A is an explanatory plan view showing a positional relationship of plate-shaped members provided with a receiving part and the movable frame, and FIG. 7B is an explanatory plan view showing a structure in a state that the plate-shaped members provided with the receiving part are detached from the movable frame. In FIGS. 7A and 7B, the holder, the movable frame and the fixed body side rectangular frame are respectively shown from the left side to the right side in the drawing.

In the optical unit 100 in this embodiment, in order to correct a shake of a hand, the optical module 10 is required to be supported so as to swing around a first axial line "L1" intersecting the optical axis "L" direction and the optical module 10 is required to be supported so as to swing around a second axial line "L2" intersecting the optical axis "L" direction and the first axial line "L1". Therefore, a gimbal mechanism 30 which will be described below with reference to FIGS. 5A through 7(B) is structured between the optical module 10 and the fixed body 20.

In this embodiment, the gimbal mechanism 30 shown in FIGS. 5A through 7B is structured by using the holder 1110 of the optical module 10, a rectangular movable frame 32, and a rectangular frame 25 (fixed body side rectangular frame) which is fixed to the upper case 1200 (fixed body 20) by welding, adhesion or the like.

In this embodiment, the movable frame 32 is provided with a first corner part 321, a second corner part 322, a third corner part 323 and a fourth corner part 324 around the optical axis "L", and a first connecting part 326 (first side part), a second connecting part 327 (second side part), a third connecting part 328 (third side part) and a fourth connecting part 329 (fourth side part) are provided between the first corner part 321 and the second corner part 322, between the second corner part 322 and the third corner part 323, between the third corner part 323 and the fourth corner part 324, and between the fourth corner part 324 and the first corner part 321.

A metal spherical body 38 is fixed to inner sides of the first corner part 321, the second corner part 322, the third corner part 323 and the fourth corner part 324 of the movable frame 32 by welding or the like. The spherical body 38 structures protruded parts 38a and 38b whose hemispheric convex surface faces an inner side in the radial direction. Therefore, all of a plurality of the protruded parts 38a and 38b are located on the same plane ("X–Y" plane) intersecting the optical axis "L".

In this embodiment, the first connecting part 326, the second connecting part 327, the third connecting part 328 and the fourth connecting part 329 are provided with meandering parts 326a, 327a, 328a and 329a which are curved in a direction perpendicular to their extending directions and the "Z"-axis direction.

The cover 1600 is fixed to the end plate part 1220 of the upper case 1200 (fixed body 20) and the rectangular frame 25 is fixed to a face on one side "+Z" in the "Z"-axis direction of the rear plate part 1630 of the cover 1600 by welding, adhesion or the like. The rectangular frame 25 is provided with a first corner part 251, a second corner part 252, a third corner part 253 and a fourth corner part 254 around the optical axis "L", and a first side part 256, a second side part 257, a third side part 258 and a fourth side part 259 are provided between the first corner part 251 and the second corner part 252, between the second corner part 252 and the third corner part 253, between the third corner part 253 and the fourth corner part 254, and between the fourth corner part 254 and the first corner part 251.

The first side part 256 and the first connecting part 326 are extended in the "Y"-axis direction on one side "+X" in the "X"-axis direction, and the third side part 258 and the third connecting part 328 are extended in the "Y"-axis direction on the other side "−X" in the "X"-axis direction. Further, the second side part 257 and the second connecting part 327 are extended in the "X"-axis direction on one side "+Y" in the "Y"-axis direction, and the fourth side part 259 and the fourth connecting part 329 are extended in the "X"-axis direction on the other side "−Y" in the "Y"-axis direction.

Therefore, the first corner parts 251 and 321 are located on one side "+X" in the "X"-axis direction and the other side "–Y" in the "Y"-axis direction, the second corner parts 252 and 322 are located on one side "+X" in the "X"-axis direction and one side "+Y" in the "Y"-axis direction, the third corner parts 253 and 323 are located on the other side "–X" in the "X"-axis direction and one side "+Y" in the "Y"-axis direction, and the fourth corner parts 254 and 324 are located on the other side "–X" in the "X"-axis direction and the other side "–Y" in the "Y"-axis direction.

Further, the rectangular frame 25 is provided with support plate parts 255 which are protruded to one side "+Z" in the "Z"-axis direction (the other side in the optical axis "L" direction) from the first corner part 251 and the third corner part 253 (one side in the optical axis "L" direction). In this embodiment, the support plate part 255 is provided with wall faces 255a and 255b which face each other on both sides in a circumferential direction and a recessed part which is opened to an outer side in a radial direction is formed between the wall faces 255a and 255b. Further, an inner side in the radial direction between the wall faces 255a and 255b is closed by a wall face 255d.

A plate-shaped member 33 which is bent in an "L" shape is fixed between the wall faces 255a and 255b. The plate-shaped member 33 is located at the same height position as the coil holding part 1150 in the "Z"-axis direction. In this embodiment, the plate-shaped member 33 is provided with a first plate part 331 which is extended in the "Z"-axis direction, and a second plate part 332 which is bent at an end part of the first plate part 331 on one side "+Z" in the "Z"-axis direction toward an outer side in the radial direction. The first plate part 331 is fixed to the wall face 255d and the wall faces 255a and 255b of the support plate part 255 formed in the rectangular frame 25. Therefore, a recessed part which is opened toward an outer side in the radial direction is formed at the first corner part 251 and the third corner part 253 of the rectangular frame 25 so as to be surrounded by the second plate part 332 of the plate-shaped member 33, the wall face 255d and the wall faces 255a and 255b of the support plate part 255, and a wall face 255c of the support plate part 255. The first plate part 331 of the plate-shaped member 33 is located on an inner side of the recessed part in the radial direction. In this embodiment, a receiving part 280 which is recessed in a hemispheric shape is formed on an outer side face of the first plate part 331 in the radial direction.

In the holder 1110 which is used in the optical module 10, an outer peripheral side of the optical element holding part 1120 which is protruded from one side "+Z" in the "Z"-axis direction (the other side in the optical axis "L" direction) toward the other side "–Z" in the "Z"-axis direction (one side in the optical axis "L" direction) is formed with recessed parts 1160 on one side "+X" in the "X"-axis direction and one side "+Y" in the "Y"-axis direction and on the other side "–X" in the "X"-axis direction and the other side "–Y" in the "Y"-axis direction. In the "Z"-axis direction, the recessed part 1160 is located at the same height position as the coil holding part 1150.

Both sides of the recessed part 1160 are surrounded by wall faces 1161 and 1162 and its one side "+Z" in the "Z"-axis direction is closed by a wall face 1163. Further, an inner side of the recessed part 1160 in the radial direction is closed by an outer face of the optical component holding part 1120.

A plate-shaped member 34 which is bent in an "L" shape is fixed to an inner side of the recessed part 1160. The plate-shaped member 34 is located at the same height position as the coil holding part 1150 in the "Z"-axis direction. In this embodiment, the plate-shaped member 34 is provided with a first plate part 341 which is extended in the "Z"-axis direction, and a second plate part 342 which is bent at an end part of the first plate part 341 on the other side "–Z" in the "Z"-axis direction toward an outer side in the radial direction. The first plate part 341 is fixed to the wall faces 1161 and 1162 of the recessed part 1160 and an outer face of the optical component holding part 1120. Therefore, the holder 1110 is formed with a recessed part which is surrounded by the wall faces 1161, 1162 and 1163 of the holder 1110 and the second plate part 342 of the plate-shaped member 34 and is opened toward an outer side in the radial direction. The first plate part 341 of the plate-shaped member 34 is located on an inner side of the recessed part in the radial direction. In this embodiment, a receiving part 480 which is recessed in a hemispheric shape is formed on an outer side face of the first plate part 341 in the radial direction.

The optical module 10 is swingably supported around the first axial line "L1" intersecting the optical axis "L" direction and the optical module 10 is swingably supported around the second axial line "L2" intersecting the optical axis "L" direction and the first axial line "L1" by using the rectangular frame 25, the movable frame 32 and the holder 1110 structured as described above.

More specifically, in a swing support part between the first corner part 321 of the movable frame 32 and the first corner part 251 of the rectangular frame 25 and, in a swing support part between the third corner part 323 of the movable frame 32 and the third corner part 253 of the rectangular frame 25, the plate-shaped members 33 provided in the rectangular frame 25 are located on inner sides of the first corner part 321 and the third corner part 323 of the movable body 32 and thus the protruded parts 38a are supported by the receiving parts 280. As a result, the first corner part 321 and the third corner part 323 located on the first axial line "L1" of the movable frame 32 are swingably supported by the first corner part 251 and the third corner part 253 of the rectangular frame 25 (fixed body 20).

More specifically, in a swing support part between the second corner part 322 of the movable frame 32 and the holder 1110 and, in a swing support part between the fourth corner part 324 of the movable frame 32 and the holder 1110, the plate-shaped members 34 provided in the holder 1110 are located on inner sides of the second corner part 322 and the fourth corner part 324 of the movable frame 32 and thus the protruded parts 38b are supported by the receiving parts 480. As a result, the second corner part 322 and the fourth corner part 324 located on the second axial line "L2" of the movable frame 32 swingably support the holder 1110 (optical module 10).

In this manner, the optical module 10 is swingably supported around the first axial line "L1" by the fixed body 20 and is swingably supported around the second axial line "L2" through the movable frame 32 which is used in the gimbal mechanism 30. Further, all of the movable frame 32 and the plate-shaped members 33 and 34 are located at the same height position as the coil holding parts. Therefore, when viewed in a direction perpendicular to the optical axis "L" direction, the gimbal mechanism 30 is provided at a position overlapping with the shake correction drive mechanism 500. Especially, in this embodiment, when viewed in a direction perpendicular to the optical axis "L" direction, the gimbal mechanism 30 is provided at a position overlapping with the center in the "Z"-axis direction of the shake correction drive mechanism 500.

In this embodiment, the movable frame 32 is structured of metal material having elasticity and is not resiliently bent to a lower side by a weight of the optical module 10 itself but, when an impact is applied from the outside, the movable frame 32 is provided with elasticity capable of absorbing the impact. Further, each of the first connecting part 326, the second connecting part 327, the third connecting part 328 and the fourth connecting part 329 of the movable frame 32 is capable of being elastically deformed to an inner side and an outer side. Therefore, the protruded parts 38a and 38b and the receiving parts 280 and 480 are elastically contacted with each other at each of the first corner part 321, the second corner part 322, the third corner part 323 and the fourth corner part 324 by elasticity of the first connecting part 326, the second connecting part 327, the third connecting part 328 and the fourth connecting part 329. Accordingly, rattling is not occurred between the protruded parts 38a and 38b and the receiving parts 280 and 480.

(Structure of Plate-Shaped Spring 70)

The optical module 10 in this embodiment includes a plate-shaped spring 70 which is connected with the optical module 10 and the fixed body 20 to determine a posture of the optical module 10 when the shake correction drive mechanism 500 is set in a stopped state. In this embodiment, the plate-shaped spring 70 is a spring member which is formed by processing a metal plate in a predetermined shape and is provided with a fixed body side connection part 71 in a rectangular frame shape, a movable body side connection part 72 in a circular ring shape, and plate spring parts 73 which connect the fixed body side connection part 71 with the movable body side connection part 72. In this embodiment, the plate spring part 73 is extended from a corner portion of the fixed body side connection part 71 to the movable body side connection part 72 while meandering from one side to the other side in a circumferential direction.

The fixed body side connection part 71 is fixed to a face of the rectangular frame 25 on the other side "−Z" in the "Z"-axis direction and the movable body side connection part 72 is fixed to an end face 1121 on the other side "−Z" in the "Z"-axis direction of the optical component holding part 1120 of the holder 1110 by welding, adhesion or the like. In this embodiment, the end face 1121 on the other side "−Z" in the "Z"-axis direction of the optical component holding part 1120 is formed with a protruded part 1123 in a circular ring shape along an inner circumferential edge. The movable body side connection part 72 is fitted to an outer side of the protruded part 1123 in a radial direction.

The plate-shaped spring 70 is, when viewed in a direction perpendicular to the optical axis "L" direction, also provided at a position overlapping with the shake correction drive mechanism 500. However, when viewed in a direction perpendicular to the optical axis "L" direction, although the gimbal mechanism 30 is provided at a position overlapping with the center in the "Z"-axis direction of the shake correction drive mechanism 500, the plate-shaped spring 70 is located on the other side "−Z" in the "Z"-axis direction relative to the position overlapping with the center in the "Z"-axis direction of the shake correction drive mechanism 500. Therefore, when viewed in a direction perpendicular to the optical axis "L" direction, the gimbal mechanism 30 is provided at a position nearer to the center position in the optical axis "L" direction of the shake correction drive mechanism 500 than the plate-shaped spring 70.

(Structure of Photo Reflector 590)

As shown in FIG. 3(B), in the optical unit 100 in this embodiment, a photo reflector 590 is mounted on a portion of the flexible circuit board 1900 which is overlapped with the optical module 10 on one side "+Z" in the "Z"-axis direction so as to direct toward one side "+Z" in the "Z"-axis direction. Further, a reflecting plate 1490 is formed on a face of the bottom plate part 1420 of the lower case 1400 on the other side "−Z" in the "Z"-axis direction at a position facing the photo reflector 590. In this embodiment, the reflecting plate 1490 is a metal block-shaped component and thus its dimension in the "Z"-axis direction (thickness) is large. Therefore, since a distance between the photo reflector 590 and the reflecting plate 1490 is short, its detection sensitivity is high.

(Structure and Basic Operation of Shake Correction Drive Mechanism 500 and the Like)

In the optical unit 100 in this embodiment, when the optical device 1000 shown in FIG. 1 is shaken, the shake is detected by a gyroscope or the like and a control IC (not shown) controls the shake correction drive mechanism 500. In other words, a drive current for canceling the shake detected by the gyroscope is supplied to the air-core coils 560. In this case, the electric current is supplied to a part of four air-core coils 560 and the electric current is not supplied to other air-core coils 560. Alternatively, the electric current is supplied to all of four air-core coils 560 but balance of the electric current supplied to the four air-core coils 560 is controlled. As a result, the optical module 10 is swung around the first axial line "L1" or around the second axial line "L2" to correct the shake of a hand. Alternatively, the optical module 10 is swung around the first axial line "L1" and is swung around the second axial line "L2" to correct the shake of a hand. In this case, the second photo reflector 590 detects a distance (displacement) with respect to the optical module 10 and the shake correction drive mechanism 500 is controlled based on a detected result by the photo reflector 590.

(Principal Effects in this Embodiment)

As described above, in the optical unit 100 in this embodiment, the rectangular movable frame 32 is disposed between the optical module 10 and the rectangular tube-shaped body part 1210 of the fixed body 20, and the first corner part 321 and the third corner part 323 of the movable frame 32 are swingably supported by the fixed body 20 and the second corner part 322 and the fourth corner part 324 of the movable frame 32 swingably support the optical module 10. Therefore, even when the optical module 10 is swingably supported by the fixed body 20 through the gimbal mechanism 30, a space for disposing the shake correction drive mechanism 500 can be secured near the first connecting part 326, the second connecting part 327, the third connecting part 328 and the fourth connecting part 329 of the movable frame 32 between a side face of the optical module 10 and a side face of the fixed body 20.

Further, in this embodiment, when viewed in a direction perpendicular to the optical axis "L" direction, the gimbal mechanism 30 is provided at a position overlapping with the shake correction drive mechanism 500. Therefore, when the optical module 10 is swung, displacement of a portion of the optical module 10 where the coils 1560 or the magnets 1520 are disposed is small and thus, even when the coils 1560 and the magnets 1520 are disposed at close positions to each other, the coils 1560 and the magnets 1520 are hard to be contacted with each other. Accordingly, the coils 1560 and the magnets 1520 can be brought close to each other and thus a large drive force is obtained. Further, in a case of the gimbal mechanism 30, when driving is stopped, a force for returning the optical module 10 to its original posture is small or no force for returning the optical module 10 to its original posture is generated. However, in this embodiment, the plate-shaped spring 70 is connected with the optical module 10 and the fixed body 20 and thus, when driving is stopped, the optical module 10 can be surely returned to its original posture. Further, when viewed in a direction perpendicular to the optical axis "L" direction, the plate-shaped spring 70 is provided at a position overlapping with the shake correction drive mechanism 500. Therefore, when the optical module 10 is swung, displacement of a portion of the optical module 10 where the plate-shaped spring 70 is disposed is small and thus deformation of the plate-shaped spring 70 is small. Accordingly, a resistance force by the plate-shaped spring 70 is small and thus, when the optical module 10 is to be swung, a large swing force can be applied to the optical module 10. Further, since deformation of the plate-shaped spring 70 is small, a structure of the plate-shaped spring 70 can be simplified.

Further, when viewed in a direction perpendicular to the optical axis "L" direction, the gimbal mechanism 30 is provided at a position nearer to a center position in the optical axis "L" direction of the shake correction drive mechanism 500 relative to the plate-shaped spring 70. Therefore, when the optical module 10 is swung, displacement of the portion of the optical module 10 where the coil 1560 or the magnet 1520 is disposed can be made small. Accordingly, the coils 1560 and the magnets 1520 can be brought close to each other and thus a large drive force is obtained.

Further, the fixed body 20 structures the gimbal mechanism 30 by utilizing the rectangular frame 25 (fixed body side rectangular frame) with which the plate-shaped spring 70 is connected and thus assembling is easily performed and the number of components can be reduced.

Further, the coils 1560 are held by the optical module 10 and the magnets 1520 are held by an inner face of the rectangular tube-shaped body part 1210 of the fixed body 20. Therefore, the coil 1560 whose weight is lighter than the magnet 1520 is provided in the optical module 10 and thus a drive current for shake correction can be made small and responsibility of shake correction can be improved.

In addition, in the optical module 10, the holder 1110 is provided with the optical component holding part 1120, the movable frame arrangement space 1140 where the movable frame 32 is disposed on an outer side in a radial direction with respect to the optical component holding part 1120, and the coil holding parts 1150 which hold the coils 1560 on an outer side with respect to the movable frame arrangement space 1140. Therefore, when viewed in the optical axis "L" direction, the gimbal mechanism 30 can be provided on an inner side with respect to an outward form of the holder 1110. Further, the coil 1560 is an air-core coil and the coil holding part 1150 is provided with the protruded part 1152 which is fitted to the opening part of the coil 1560. Therefore, the coil 1560 can be easily and surely provided at a predetermined position. Further, the protruded part 1152 is protruded toward the magnet 1520 from a face of the coil 1560 facing the magnet 1520. Therefore, even in a case that the optical module 10 is swung due to an impact or the like or, even in a case that the optical module 10 is displaced in a direction perpendicular to the optical axis "L" direction, the coil 1560 does not contact with the magnet 1520. Accordingly, damage of the coil 1560 can be prevented.

Further, the coil holding parts 1150 are provided on outer sides in a radial direction with respect to the middle positions of the first connecting part 326, the second connecting part 327, the third connecting part 328 and the fourth connecting part 329 of the movable frame 32. Therefore, the coil holding parts 1150 are provided at angular positions which are displaced from the first corner part 321, the second corner part 322, the third corner part 323 and the fourth corner part 324 of the movable frame 32 and thus, when viewed in the optical axis "L" direction, an outward form of the holder 1110 can be made small.

Further, when viewed in the optical axis "L" direction, the end plate part 1220 of the upper case 1200 is formed with the opening part 1221 whose opening edge is located on outer sides in a radial direction relative to faces of the magnets 1520 facing the coils 1560 and thus magnetic lines of force of the magnet 1520 can be suppressed from going to a side of the end plate part 1220 of the upper case 1200 (yoke) on the front side in the optical axis "L" direction. Accordingly, intensity of the magnetic field interlinking with the coil 1560 can be increased.

Further, the nonmagnetic cover 1600 is fixed to the end plate part 1220 of the upper case 1200. The cover 1600 is provided with the tube part 1620 which is protruded from an inner circumferential edge of the front plate part 1610 overlapped with the end plate part 1220 toward a rear side in the optical axis "L" direction through the opening part 1221 of the upper case 1200 and surrounds the front side end part in the optical axis "L" direction of the optical module 10. Therefore, dust and the like can be suppressed from entering into the inside. Further, the cover 1600 is nonmagnetic and thus, even when the cover 1600 is provided, magnetic lines of force of the magnet 1520 can be suppressed from going in an unnecessary direction. Therefore, intensity of magnetic field interlinked with the coil 1560 can be increased.

Further, the front plate part 1610 of the cover 1600 is fixed with the plate-shaped stopper 1700 which surrounds the front side end part in the optical axis "L" direction of the optical module 10 when viewed from a front side in the optical axis "L" direction. Therefore, even in a case that the optical module 10 is swung due to an impact or the like, or even in a case that the optical module 10 is displaced in a direction perpendicular to the optical axis direction, its displaced amount can be restricted by the plate-shaped stopper 1700. Further, the plate-shaped stopper 1700 restricts displacement of the optical module 10 by abutting with the front side end part in the optical axis "L" direction of the optical module 10 and thus the plate-shaped stopper 1700 is separated from a swing center of the optical module 10. Therefore, in comparison with a case that displacement of the optical module 10 is restricted by abutting of the coil 1560 with the magnet 1520 or the like, attaching accuracy of components is hardly affected and thus displacement allowance amount can be set with a high degree of accuracy.

Further, the flexible circuit board 1900 which is connected with the optical module 10 is provided with the first curved part 1910 and the second curved part 1920 which are bent in a circular arc shape on the way of its extending portion along the "Y" direction. Therefore, even when the optical module 10 is swung in the "Y" direction, the flexible circuit board 1900 does not apply a large resistance force to the optical module 10. Further, the first curved part 1910 and the second curved part 1920 are curved in reverse directions to each other and, in addition, the first curved part 1910 and the second curved part 1920 are curved with the same radius of curvature as each other. Therefore, when the optical module 10 is swung in the "Y" direction, resistance forces applied to the optical module 10 in the first curved part 1910 and the second curved part 1920 can be canceled. Further, in the flexible circuit board 1900, the first curved part 1910, the strip-shaped part 1930 and the second curved part 1920 are branched into two portions in the "X" direction (second direction) by the slit 1950 extending along the "Y" direction (first direction). Therefore, even when the optical module 10 is swung in the "X" direction, the flexible circuit board 1900 does not apply a large resistance force to the optical module 10.

Further, the gimbal mechanism 30 is structured so that the protruded parts 38*a* and 38*b* are supported by the receiving parts 280 and 480 in a concave shape and thus, in comparison with a case swingably structured through a shaft body, assembling process can be simplified. In addition, the protruded parts 38*a* and 38*b* are formed so that their tip end faces located on the sides of the receiving parts 280 and 480 are formed in a hemispheric shape. Therefore, even when the movable frame 32 and the optical module 10 are swung in any posture, sliding of the protruded parts 38*a* and 38*b* on the receiving parts 280 and 480 is smooth. Further, the protruded parts 38*a* and 38*b* and the receiving parts 280 and 480 are elastically contacted with each other by elasticity of the movable frame 32. Therefore, rattling is hard to be occurred between the protruded parts 38*a* and 38*b* and the receiving parts 280 and 480.

Further, all of a plurality of the protruded parts 38*a* and 38*b* are provided on the side of the movable frame 32. Further, all of a plurality of the protruded parts 38*a* and 38*b* are located on the same plane intersecting the optical axis "L". Therefore, the structure of the gimbal mechanism 30 can be simplified.

Further, the receiving parts 280 and 480 are respectively formed in the plate-shaped members 33 and 34 which are separately formed from the fixed body 20 and the holder 1110. Therefore, regardless of structure and material of the fixed body 20 and the holder 1110 of the optical module 10, the receiving parts 280 and 480 can be structured superior in slidability and durability for the protruded parts 38*a* and 38*b*.

Further, the protruded parts 38*a* provided in the first corner part 321 and the third corner part 323 of the movable frame 32 are surrounded by the wall faces 255*a*, 255*b* and 255*c* of the fixed body 20 side and the second plate parts 332 (wall face) of the plate-shaped members 33. Further, the protruded parts 38*b* provided in the second corner part 322 and the fourth corner part 324 of the movable frame 32 are surrounded by the wall faces 1161, 1162 and 1163 of the optical module side and the second plate parts 342 (wall face) of the plate-shaped members 34. Therefore, even when an impact is applied, the protruded parts 38*a* and 38*b* are hard to be disengaged from the receiving parts 280 and 480.

[Other Structural Examples of Optical Unit 100]

In the embodiment described above, at least an embodiment of the present invention is, as an example, applied to the optical unit 100 which is used in a cell phone with a camera. However, at least an embodiment of the present invention may be applied to the optical unit 100 which is used in a thin digital camera or the like. Further, other than a cell phone, a digital camera and the like, the optical unit 100 with a shake correction function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with a posture stabilizing device and thus a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correction function to which at least an embodiment of the present invention is applied is mounted at a position which is capable of photographing toward a front side in a car, it can be used as a drive recorder. Further, it may be structured that the optical unit 100 with a shake correction function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the Vehicle Information and Communication System or the like, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correction function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correction function, the optical unit comprising:
   an optical module;
   a fixed body comprising a body part which surrounds the optical module;

a gimbal mechanism which swingably supports the optical module around a first axial line intersecting an optical axis direction and swingably supports the optical module around a second axial line intersecting the optical axis direction and the first axial line;

a shake correction drive mechanism which comprises a coil and a magnet between a side face of the optical module and a side face of the body part and is structured to drive the optical module around the first axial line and around the second axial line; and a plate-shaped spring which is connected with the optical module and the fixed body to determine posture of the optical module when the shake correction drive mechanism is set in a stopped state;

wherein the gimbal mechanism comprises a movable frame in a rectangular shape provided around an optical axis with a first corner part, a second corner part adjacent to the first corner part, a third corner part separated from the first corner part in a first axial line direction, and a fourth corner part separated from the second corner part in a second axial line direction;

the first corner part and the third corner part of the movable frame are swingably supported by the fixed body, and the second corner part and the fourth corner part of the movable frame swingably support the optical module;

wherein when viewed in a direction perpendicular to the optical axis direction, the gimbal mechanism and the plate-shaped spring are provided at positions overlapping with the shake correction drive mechanism.

2. The optical unit with a shake correction function according to claim 1, wherein when viewed in the direction perpendicular to the optical axis direction, the gimbal mechanism is provided at a position nearer to a center position of the shake correction drive mechanism in the optical axis direction than the plate-shaped spring.

3. The optical unit with a shake correction function according to claim 1, wherein
the fixed body comprises a fixed body side rectangular frame with which the plate-shaped spring is connected, and
the first corner part and the third corner part of the movable frame are swingably supported by the fixed body side rectangular frame.

4. The optical unit with a shake correction function according to claim 1, wherein
the coil is held by the optical module, and
the magnet is held by an inner face of the body part.

5. The optical unit with a shake correction function according to claim 4, wherein
the optical module comprises an optical component and a holder which holds the optical component, and
the holder is provided with an optical component holding part which holds the optical component, a movable frame arrangement space in which the movable frame is disposed on an outer side in a radial direction with respect to the optical component holding part, and a coil holding part which holds the coil used in the shake correction drive mechanism on an outer side with respect to the movable frame arrangement space.

6. The optical unit with a shake correction function according to claim 5, wherein
the coil is an air-core coil, and
the coil holding part is provided with a protruded part which is fitted to an opening part of the coil.

7. The optical unit with a shake correction function according to claim 6, wherein the protruded part is protruded from a face of the coil facing the magnet toward the magnet.

8. The optical unit with a shake correction function according to claim 7, wherein the coil holding part is provided on an outer side in a radial direction with respect to a middle position between the first corner part and the second corner part, on an outer side in the radial direction with respect to a middle position between the second corner part and the third corner part, on an outer side in the radial direction with respect to a middle position between the third corner part and the fourth corner part, and on an outer side in the radial direction with respect to a middle position between the fourth corner part and the first corner part.

9. The optical unit with a shake correction function according to claim 4, wherein
the fixed body comprises a yoke provided with the body part and an end plate part in a frame shape which is protruded from a front side end part of the body part in the optical axis direction to an inner side in the radial direction, and
the end plate part is formed with an opening part whose opening edge is located on an outer side in the radial direction relative to a face of the magnet facing the coil when viewed in the optical axis direction.

10. The optical unit with a shake correction function according to claim 9, further comprising a cover which is made of nonmagnetic material and is fixed to the end plate part of the yoke,
wherein the cover comprises:
a front plate part which is formed in a frame shape and is overlapped with a face of the end plate part on the front side in the optical axis direction; and
a tube part which is protruded from an inner circumferential edge of the front plate part toward a rear side in the optical axis direction through the opening part and surrounds a front side end part in the optical axis direction of the optical module.

11. The optical unit with a shake correction function according to claim 10, further comprising a plate-shaped stopper which is fixed to the front plate part so as to surround the front side end part of the optical module when viewed from the front side in the optical axis direction.

12. The optical unit with a shake correction function according to claim 1, further comprising a flexible circuit board which is connected with a rear side end part of the optical module in the optical axis direction so as to extend along a first direction perpendicular to the optical axis direction,
wherein the flexible circuit board comprises:
a first curved part which is bent in a circular arc shape at a position on one side in the first direction with respect to a portion overlapping with the optical module in the optical axis direction toward the other side in the first direction;
a strip-shaped part which is extended to the other side in the first direction from the first curved part; and
a second curved part which is bent in a circular arc shape at an end part located on the other side in the first direction with respect to a portion of the strip-shaped part overlapping with the optical module in the optical axis direction toward the one side in the first direction; and
wherein the first curved part, the strip-shaped part and the second curved part are branched into two portions through a slit extending along the first direction in the second direction perpendicular to the optical axis direction and the first direction.

13. The optical unit with a shake correction function according to claim 1, wherein
   in the gimbal mechanism, a swing support part provided between the first corner part and the fixed body and a swing support part provided between the third corner part and the fixed body respectively comprise a protruded part which is provided in the movable frame and a receiving part in a concave shape which is provided in the fixed body and receives a tip end side of the protruded part, and
   a swing support part provided between the second corner part and the optical module and a swing support part provided between the fourth corner part and the optical module respectively comprise a protruded part which is provided in the movable frame and a receiving part in a concave shape which is provided in the optical module and receives a tip end side of the protruded part.

14. The optical unit with a shake correction function according to claim 13, wherein a tip end face of the protruded part located on a receiving part side is formed in a hemispheric shape.

15. The optical unit with a shake correction function according to claim 14, wherein the protruded part is structured of a spherical body.

16. The optical unit with a shake correction function according to claim 13, wherein
   in the movable frame, a first connecting part which connects the first corner part with the second corner part, a second connecting part which connects the second corner part with the third corner part, a third connecting part which connects the third corner part with the fourth corner part, and a fourth connecting part which connects the fourth corner part with the first corner part are respectively capable of being elastically deformed, and
   in all of the first corner part, the second corner part, the third corner part and the fourth corner part, the protruded part and the receiving part are elastically contacted with each other by elasticity of the first connecting part, the second connecting part, the third connecting part and the fourth connecting part.

17. The optical unit with a shake correction function according to claim 16, wherein each of the first connecting part, the second connecting part, the third connecting part and the fourth connecting part is provided with a meandering part which meanders in a direction intersecting the optical axis direction.

18. The optical unit with a shake correction function according claim 13, wherein each of the protruded parts is provided on a movable frame side.

19. The optical unit with a shake correction function according to claim 18, wherein the protruded parts are respectively located in the same plane intersecting the optical axis as each other.

20. The optical unit with a shake correction function according to claim 18, wherein
   each of the protruded parts is provided on an inner side of the movable frame,
   two receiving parts provided in the first corner part and the third corner part are formed in a portion which is protruded in the optical axis direction from a fixed body side and is located on an inner side of the movable frame, and
   two receiving parts provided in the second corner part and the fourth corner part are formed in a portion which is protruded in the optical axis direction from an optical module side and is located on an inner side of the movable frame.

21. The optical unit with a shake correction function according to claim 20, wherein
   the two receiving parts provided in the first corner part and the third corner part are formed in a portion which is protruded from one side position in the optical axis direction with respect to the movable frame to the other side in the optical axis direction and is located on the inner side of the movable frame, and
   the two receiving parts provided in the second corner part and the fourth corner part are formed in a portion which is protruded from the other side position in the optical axis direction with respect to the movable frame to the one side in the optical axis direction and is located on the inner side of the movable frame.

22. The optical unit with a shake correction function according to claim 20, wherein
   the two receiving parts provided in the first corner part and the third corner part are respectively formed in a plate-shaped member which is fixed to the fixed body side, and
   the two receiving parts provided in the second corner part and the fourth corner part are respectively formed in a plate-shaped member which is fixed to the optical module side.

23. The optical unit with a shake correction function according to claim 13, wherein
   the fixed body comprises two wall faces, which surround each of the two protruded parts provided in the first corner part and the third corner part from both sides, and two wall faces which surround each of the two protruded parts provided in the first corner part and the third corner pan from both sides in the optical axis direction, and
the optical module comprises two wall faces, which surround each of the two protruded parts provided in the second corner part and the fourth corner part from both sides, and two wall faces which surround each of the two protruded parts provided in the second corner part and the fourth corner part from both sides in the optical axis direction.

* * * * *